US012759023B2

(12) United States Patent
Park et al.

(10) Patent No.: US 12,759,023 B2
(45) Date of Patent: Oct. 13, 2026

(54) CLEANING SYSTEM

(71) Applicant: LG ENERGY SOLUTION, LTD., Seoul (KR)

(72) Inventors: Kyeong Hoon Park, Daejeon (KR); Hak Kyun Kim, Daejeon (KR); Je Jun Lee, Daejeon (KR); Jimin Jung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 176 days.

(21) Appl. No.: 18/854,853

(22) PCT Filed: Dec. 13, 2023

(86) PCT No.: PCT/KR2023/020507
§ 371 (c)(1),
(2) Date: Oct. 7, 2024

(87) PCT Pub. No.: WO2024/136272
PCT Pub. Date: Jun. 27, 2024

(65) Prior Publication Data

US 2026/0175262 A1 Jun. 25, 2026

(30) Foreign Application Priority Data

Dec. 23, 2022 (KR) ........................ 10-2022-0183448

(51) Int. Cl.
*B08B 1/12* (2024.01)
*B08B 3/02* (2006.01)
(Continued)

(52) U.S. Cl.
CPC .................. *B08B 1/12* (2024.01); *B08B 3/02* (2013.01); *B08B 3/08* (2013.01); *H01M 50/152* (2021.01); *H01M 50/167* (2021.01)

(58) Field of Classification Search
None
See application file for complete search history.

(56) References Cited

U.S. PATENT DOCUMENTS

2004/0121229 A1 6/2004 Kim et al.
2008/0173331 A1 7/2008 Morimoto et al.

FOREIGN PATENT DOCUMENTS

CN 202061844 U 12/2011
CN 112403956 A 2/2021
(Continued)

OTHER PUBLICATIONS

Search in Google Scholar and Google Patents (Year: 2026).*
MTI Crimper Cleaning Manual (Year: 2026).*
(Continued)

*Primary Examiner* — Rita P Adhlakha
(74) *Attorney, Agent, or Firm* — Birch, Stewart, Kolasch & Birch, LLP

(57) ABSTRACT

A cleaning system may include two or more dummy cans configured to clean a surface of a crimping device. The crimping device may be used for a process of crimping a cylindrical secondary battery for sealing an opened upper end of a battery can in which an electrode assembly and a cap assembly are accommodated. The two or more dummy cans each may include a brush provided on an outer surface thereof, and the surface of the crimping device is cleaned by the brush.

12 Claims, 4 Drawing Sheets

(51) Int. Cl.

| | |
|---|---|
| ***B08B 3/08*** | (2006.01) |
| ***H01M 50/152*** | (2021.01) |
| ***H01M 50/167*** | (2021.01) |

(56) References Cited

FOREIGN PATENT DOCUMENTS

| | | | |
|---|---|---|---|
| JP | 10-250833 | A | 9/1998 |
| JP | 10-255817 | A | 9/1998 |
| JP | 2002-175788 | A | 6/2002 |
| JP | 2004-103575 | A | 4/2004 |
| JP | 2004-181315 | A | 7/2004 |
| JP | 2008-84673 | A | 4/2008 |
| JP | 2018-41687 | A | 3/2018 |
| JP | 2020-106393 | A | 7/2020 |
| KR | 10-2018-0012511 | A | 2/2018 |
| KR | 10-2022-0041772 | A | 4/2022 |
| KR | 10-2022-0060714 | A | 5/2022 |

OTHER PUBLICATIONS

Kayyar A, Huang J, Samiee M, Luo J. Construction and testing of coin cells of lithium ion batteries. J Vis Exp. Aug. 2, 2012;(66):e4104. doi: 10.3791/4104. PMID: 22895280; PMCID: PMC3476756. (Year: 2012).*

International Search Report (PCT/ISA/210) issued in PCT/KR2023/020507, dated Mar. 29, 2024.

Extended European Search Report for European Application No. 23907558.3, dated May 14, 2025.

Korean Office Action for Korean Application No. 10-2022-0183448, dated Oct. 2, 2025, with English translation.

* cited by examiner

[Figure 1]
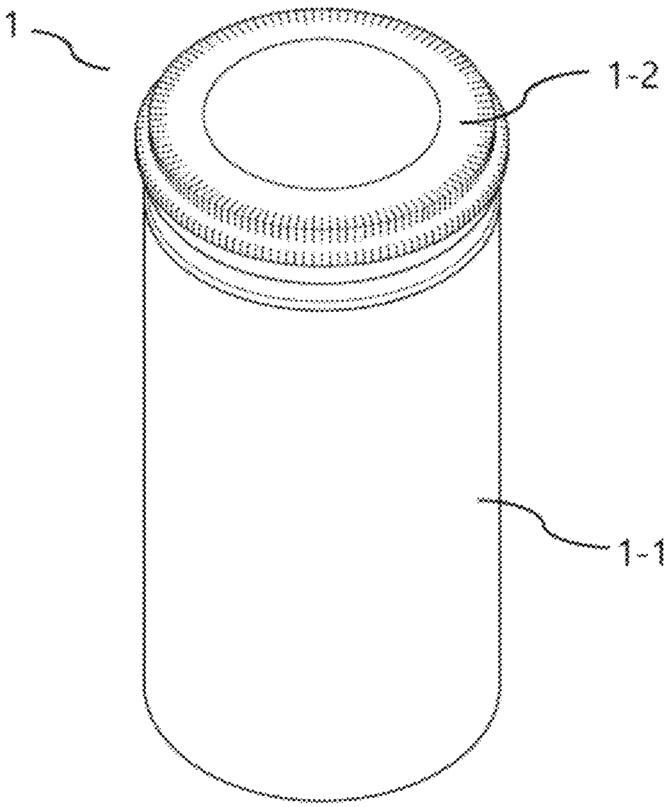

[Figure 2]
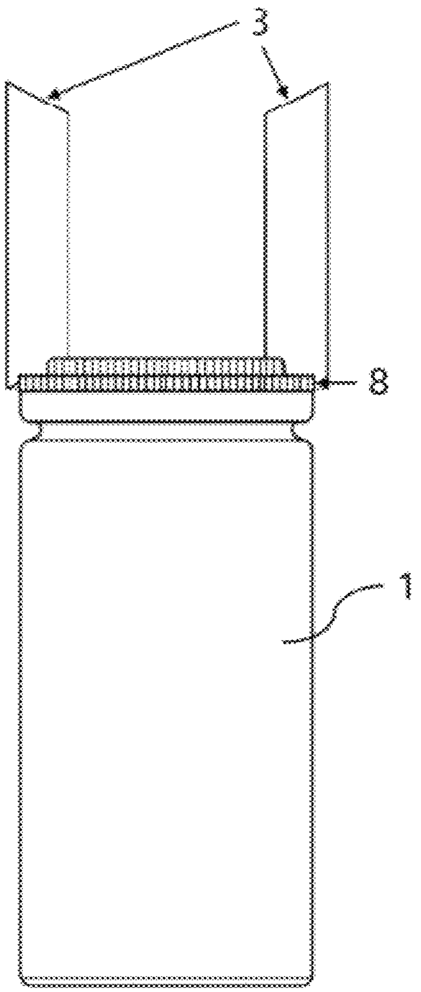

[Figure 3]
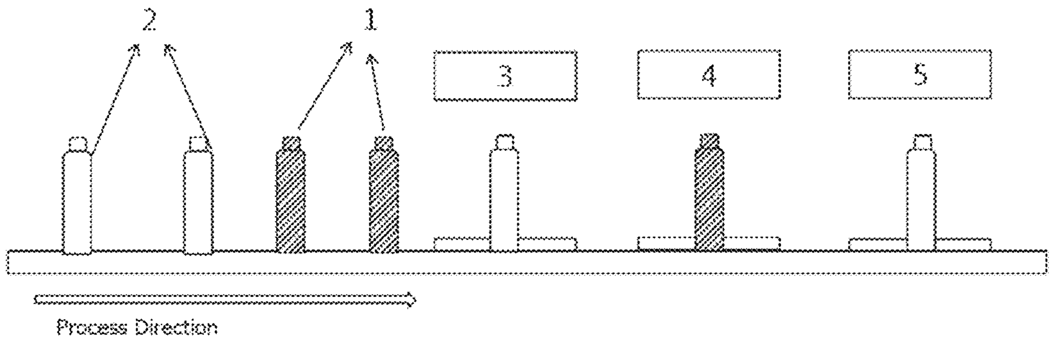

[Figure 4]
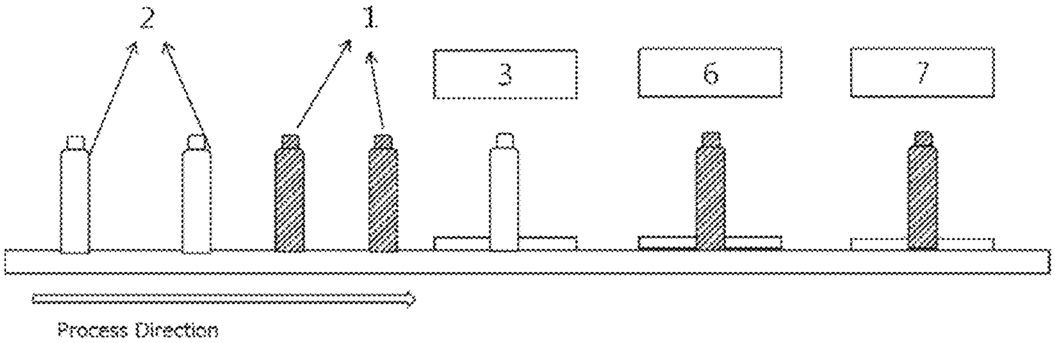

CLEANING SYSTEM

TECHNICAL FIELD

The present invention relates to a cleaning system.

This application claims priority to and the benefit of Korean Patent Application No. 10-2022-0183448 filed in the Korean Intellectual Property Office on Dec. 23, 2022, the entire contents of which are incorporated herein by reference.

BACKGROUND ART

A secondary battery refers to a battery that may be reused by being charged even after the battery is discharged. The secondary batteries may be used as energy sources for small-scale devices such as portable phones, tablet PCs, and cleaners and also used as energy sources for middle-scale or large-scale devices such as vehicles and an energy storage system (ESS) for a smart grid.

The secondary batteries may be classified into a can-type battery in which an electrode assembly is embedded in a cylindrical battery can, and a pouch-type battery in which an electrode assembly is embedded in a pouch-type casing. In general, it is known that a cylindrical battery can type battery has a relatively high capacity and is excellent in structural stability.

A cylindrical secondary battery may be manufactured by accommodating an electrode assembly, which has a wound structure, in a cylindrical battery can, injecting an electrolyte into the battery can, and then coupling a cap assembly, which has an electrode terminal, to an opened upper end of the battery can.

The cylindrical secondary battery may be formed to have an intended external shape and sealed by a crimping process that sequentially performs a rolling process and a pressing process.

In this case, during the crimping process, a crimping device is contaminated by the electrolyte, which causes the crimping device to be overblown or stuck by foreign substances. In order to cope with the contamination of the crimping device in the related art, an air knife, a vacuum suction, and the like have been used. However, because these components use air, a cleaning effect is low, and there is a limitation in removing dried salt and the like.

Accordingly, there is an acute need for a technology capable of basically solving the above-mentioned problems.

DETAILED DESCRIPTION OF THE INVENTION

Technical Problem

The present invention has been made in an effort to solve the above-mentioned problem in the related art, and an object of the present invention is to provide a cleaning system capable of cleaning a crimping device used during a crimping process.

Technical Solution

An aspect of the present invention includes a cleaning system including two or more dummy cans configured to clean a surface of a crimping device, wherein the crimping device is used for a process of crimping a cylindrical secondary battery for sealing an opened upper end of a battery can in which an electrode assembly and a cap assembly are accommodated, and the two or more dummy cans each have a brush provided on an outer surface thereof, and the surface of the crimping device is cleaned by the brush.

The surface of the crimping device may be cleaned by physical friction with the brush.

The crimping device may be a roller and a punch configured to seal the cylindrical secondary battery by pressing the opened upper end of the battery can.

The brush provided on the two or more dummy cans may be cleaned in a cleaning line configured to clean the cylindrical secondary battery, and the cleaning line configured to clean the cylindrical secondary battery may be connected to a crimping line configured to perform a crimping process on the cylindrical secondary battery, and a drying line configured to perform a drying process on the cylindrical secondary battery.

The cleaning line configured to clean the cylindrical secondary battery may include a hydraulic cleaning part configured to mix water and a cleaning agent and clean the cylindrical secondary battery by nozzle spraying, and the brush, which is provided on one of the two or more dummy cans, and at least one of the brush, which is provided on one of the two or more dummy cans, and an outer surface of the cylindrical secondary battery, which has been subjected to the crimping process, is cleaned by the hydraulic cleaning part.

The cleaning system may further include a first station configured to clean the brush by dipping the brush in a cleaning agent.

The brush which has already been used to clean the crimping device, may be cleaned by the hydraulic cleaning part.

The cleaning system may further include a drying part configured to dry at least one of the brush and the outer surface of the cylindrical secondary battery cleaned by the hydraulic cleaning part.

Each dummy can that has been dried by the drying part, may be loaded back into the process of crimping the cylindrical secondary battery.

The brush, which has already been used to clean the crimping device, may be cleaned by the first station.

The cleaning system may further include a second station configured to dry the brush cleaned by the first station.

Each dummy can that has been dried by the second station may be loaded back into the process of crimping the cylindrical secondary battery.

Advantageous Effects

According to the cleaning system of the present invention, it is possible to easily remove even foreign substances that are not removed well by a cleaning method using air among foreign substances attached to the crimping device.

BRIEF DESCRIPTION OF DRAWINGS

FIG. 1 is a view illustrating a dummy can of a cleaning system according to an embodiment of the present specification.

FIG. 2 is a view illustrating a state in which a crimping device of the cleaning system according to the embodiment of the present specification comes into contact with a brush of the dummy can and is cleaned.

FIG. 3 is a view schematically illustrating a process of the cleaning system according to the embodiment of the present specification.

FIG. 4 is a view schematically illustrating a process of a cleaning system according to another embodiment of the present specification.

EXPLANATION OF REFERENCE NUMERALS AND SYMBOLS

1: Dummy can
1-1: Main body part
1-2: Forming part
2: Cylindrical secondary battery
3: Crimping device
4: Hydraulic cleaning part
5: Drying part
6: First station
7: Second station
8: Brush

BEST MODE

Hereinafter, the present specification will be described in more detail.

Hereinafter, exemplary embodiments of the present invention will be described in detail with reference to the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method. Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various equivalents and modified examples capable of substituting the exemplary embodiments may be made at the time of filing the present application.

In addition, to help understand the present invention, the accompanying drawings are not illustrated based on actual scales, but some constituent elements may be exaggerated in dimension. In addition, the constituent elements in different embodiments may be assigned with the same reference numerals.

In the present specification, the term "on" not only means that a layer is positioned on one layer while being in physical contact with the layer but also means that a layer is positioned above one layer. That is, still another layer may be present between one layer and another layer positioned on one layer.

In the specification, unless explicitly described to the contrary, the word "comprise" or "include" and variations, such as "comprises", "comprising", "includes" or "including", will be understood to imply the inclusion of stated constituent elements, not the exclusion of any other constituent elements.

In the present specification, the term "secondary battery" refers to a battery that may be repeatedly used for a long period of time by being recharged. The secondary batteries may be classified into a nickel-cadmium battery, a lithium-ion secondary battery, and the like depending on the type of electrode active material. The secondary batteries may be classified into a pouch-type secondary battery, an angular secondary battery, a cylindrical secondary battery, and the like depending on the shape of the secondary battery.

In the present specification, the secondary battery may include a battery can that accommodates an electrode assembly. The battery can may have a cylindrical shape.

For example, the cylindrical secondary battery may be a cylindrical secondary battery having a ratio of a form factor larger than about 0.4 (a ratio of the form factor is defined as a value made by dividing a diameter of the cylindrical secondary battery by a height of the cylindrical secondary battery, i.e., a ratio of a diameter @ to a height H).

In this case, the form factor means a value indicating the diameter and the height of the cylindrical secondary battery.

In the present specification, the term "cylindrical secondary battery" refers to a secondary battery having a cylindrical shape or a shape similar to the cylindrical shape. Because the cylindrical secondary battery has a high energy density per volume, the cylindrical secondary battery is widely used for high-capacity electronic and electrical devices. A plurality of cylindrical secondary batteries may be used and combined to constitute a battery pack.

In the present specification, the term "cylindrical secondary battery" may be 46110 cell, 48750 cell, 48110 cell, 48800 cell, or 46800 cell, for example. In the numerical value indicating the form factor, the first two numbers indicate a diameter of the cell, the next two numbers indicate a height of the cell, and the final number 0 indicates that a cross-section of the cell is circular. If the height of the cell is 100 mm or more, three numbers are required to indicate the height of the cell, and thus the last number "0" may be omitted.

In addition, the term "first electrode" refers to a positive electrode, and the term "second electrode" refers to a negative electrode or vice versa.

In addition, the battery can refer to a receptacle having an approximately cylindrical shape having an opening portion at one side thereof and is made of a metallic material having conductivity. A lateral surface of the battery can and a surface opposite to the opening portion may be generally integrated. That is, based on a height direction of the battery can, the battery can is generally configured such that an upper end thereof is opened, and a lower end thereof is closed in the remaining region except for a central portion. The lower surface of the battery can may have an approximately flat shape. The battery can accommodate the electrode assembly through the opening portion formed at one side based on the height direction thereof.

The battery can may also accommodate the electrolyte through the opening portion.

The present specification provides a cleaning system including two or more dummy cans 1 configured to clean a surface of a crimping device 3 used for a process of crimping a cylindrical secondary battery to seal an opened upper end of a battery can in which an electrode assembly and a cap assembly are accommodated. The two or more dummy cans 1 each have a brush 8 provided on an outer surface thereof, and the brush 8 cleans the surface of the crimping device 3.

In the present specification, the crimping process means a process of sealing the opened upper end of the battery can that accommodates the electrode assembly and the cap assembly. More specifically, the battery may be formed to have an intended external shape and sealed by the crimping process that sequentially performs a rolling process and a pressing process after the cap assembly is coupled to the opened upper end of the battery can.

In the embodiment of the present specification, the two or more dummy cans may each include the brush, and the surface of the crimping device is cleaned by physical friction with the brush. That is, the crimping device and the brush are brought into physical contact with each other by the crimping process, such that foreign substances attached to the surface of the crimping device are removed by the brush.

In the present specification, the dummy can 1, instead of a cylindrical secondary battery, is loaded into a crimping process facility for the cylindrical secondary battery and serves to remove foreign substances attached to the crimping device 3. Therefore, the dummy can 1 has basically the same shape as the cylindrical secondary battery.

For example, the dummy can 1 is moved in a fixed state, and the crimping device 3 is operated by a process identical to the process of manufacturing a cylindrical secondary battery in the related art, such that the crimping device 3 is cleaned by the brush 8 attached to the dummy can 1.

The dummy can 1 according to the present specification may be made of a metallic material such as stainless steel such as SUS 420. After the dummy can 1 is processed in a can shape, the brush 8 made of a suede material may be attached to an outer surface of the dummy can 1. Because the dummy can 1 is made of a metallic material as described above, the dummy can 1 may be easily fixed to a device for fixing the battery can by using a magnetic force or the like in the apparatus for manufacturing a cylindrical secondary battery.

The dummy can 1 has the same size and shape as the cylindrical secondary battery.

In the embodiment of the present specification, the dummy can 1, which serves to clean the crimping device 3 during the crimping process, may have the same size and shape as the cylindrical secondary battery.

In the embodiment of the present specification, the dummy can 1, which serves to clean the crimping device 3 during the crimping process, may have a different size and shape from the cylindrical secondary battery.

That is, the shape and size of the dummy can 1 may be appropriately changed and applied depending on the type and size of the cylindrical secondary battery, which is applied to a crimping process line and the size and material of the brush 8 attached to the dummy can 1.

In the embodiment of the present specification, the dummy can 1 may include a cylindrical main body part 1-1, and a forming part 1-2 perpendicularly extending from an upper end of the main body part and having a formed external shape. The brush 8 may be provided on an outer surface of the forming part. The outer surface of the forming part 1-2 means a lateral surface of the forming part, except for upper and lower surfaces of the forming part.

FIGS. 1 and 2 are views illustrating the dummy can 1 used for the cleaning system according to the embodiment of the present specification and illustrate the main body part 1-1, the forming part 1-2 positioned at the upper end of the main body part, and the brush 8 provided on the lateral surface of the forming part.

In the embodiment of the present specification, the dummy can 1 may include the cylindrical main body part 1-1, and the forming part 1-2 perpendicularly extending from the upper end of the main body part 1-1 and having a formed external shape. The brush 8 may be provided on the lateral surface of the forming part 1-2.

The formed external shape of the forming part 1-2 is not limited and may be appropriately changed depending on an external shape of a cylindrical secondary battery to be manufactured.

In the embodiment of the present specification, the forming part 1-2 may include one or more regions in which the dummy can 1 is curved inward. The forming part 1-2 may include two or more regions or three or more regions.

In the present specification, as illustrated in FIG. 2, the two or more dummy cans 1 may each include the brush 8 and clean the surface of the crimping device 3 by using physical friction with the brush.

The brush may be made of a fiber material to remove foreign substances on the surface of the crimping device 3 of the cylindrical secondary battery and remove foreign substances by using physical friction. In particular, the brush may be made of a suede material. The suede material may be suitably used because the suede material has low surface friction and excellent traveling performance when the suede material travels along a line in the manufacturing apparatus, and the suede material is comparatively inexpensive and easy to process.

In the embodiment of the present specification, a thickness of the brush 8 may be 0.5 to 2 mm, more particularly 1 to 1.5 mm. The thickness of the brush means a length from an upper surface of the brush to a lower surface of the brush in a vertical direction.

If the thickness is less than 0.5 mm, the thickness is not preferable because the brush may have a problem with durability such as a situation in which the brush is torn when traveling. If the thickness is more than 2 mm, the thickness is not preferable because the brush hardly comes into contact with the dummy can, a tolerance increases in the process line, and thus the brush cannot smoothly travel.

In the embodiment of the present specification, the crimping device 3 may mean a device configured to form an external shape of the battery can by pressing the opened upper end of the battery can.

In the embodiment of the present specification, the crimping device 3 may include a roller and a punch configured to seal the cylindrical secondary battery by pressing the opened upper end of the battery can.

The roller and the punch may be a rolling mold and a punch mold that may apply a pressure to deform the upper end of the battery can to a predetermined shape in order to seal the opened upper end of the battery can.

In the present specification, the roller may mean plurality of molds that may apply a pressure to deform an end of an outer peripheral surface of the battery can by pressing the end of the outer peripheral surface of the battery.

In the present specification, the punch is configured as the plurality of molds that may apply a pressure to deform the upper end of the battery can to a predetermined shape in order to seal the opened upper end of the battery can. The plurality of molds is sequentially lowered one by one in the order of increasing diameters and stacked on one another while pressing the upper end of the battery can.

Because the brush 8 provided on the dummy can 1 is in a state contaminated by the electrolyte during the crimping process as described above, the brush needs to be cleaned.

In the embodiment of the present specification, the brush provided on the dummy can is cleaned in a cleaning line for cleaning the cylindrical secondary battery. The cleaning line for cleaning the cylindrical secondary battery may be connected to a crimping line for performing the crimping process on the cylindrical secondary battery and a drying line for performing a drying process on the cylindrical secondary battery.

In the embodiment of the present specification, the cleaning line for cleaning the cylindrical secondary battery may include a hydraulic cleaning part configured to mix water and a cleaning agent and clean the cylindrical secondary battery by nozzle spraying. At least one of the brush, which is provided on the dummy can, and the outer surface of the cylindrical secondary battery, which has been completely subjected to the crimping process, may be cleaned by the hydraulic cleaning part.

That is, after the crimping process on the cylindrical secondary battery, the cleaning process is continuously performed on the outer surface of the cylindrical secondary battery in the cleaning line. This means that during the cleaning process, the hydraulic cleaning part 4 is used in common to clean at least one of the brush 8 provided on the dummy can 1 and the outer surface of the cylindrical secondary battery that has been completely subjected to the crimping process.

Therefore, the hydraulic cleaning part 4 has not only the original purpose of cleaning the outer surface of the cylindrical secondary battery that has been completely subjected to the crimping process during the process of manufacturing the cylindrical secondary battery, but also the purpose of cleaning the brush provided on the dummy can used for the cleaning system of the present invention. That is, with reference to FIG. 3, the dummy can and the cylindrical secondary battery, which have been subjected to the crimping process, may move along the same cleaning line and be cleaned by the hydraulic cleaning part 4.

The order in which the dummy can and the cylindrical secondary battery are cleaned by the hydraulic cleaning part 4 is not limited. For example, after the dummy can 1 is loaded into the hydraulic cleaning part 4, the cylindrical secondary battery, which has been completely subjected to the crimping process, may be loaded and cleaned. Alternatively, the dummy can 1 and the hydraulic cleaning part 4 may be loaded in the reverse order or loaded simultaneously and cleaned.

In another embodiment of the present specification, the cleaning system may further include a first station 6 configured to clean the brush provided on the dummy can by dipping the brush in a cleaning agent. That is, the brush 8 may clean the brush by dipping the brush in a container, which contains the cleaning agent, and then taking the brush out of the container.

With reference to FIG. 4, the dummy can 1, which has completely cleaned the crimping device, cleans the brush provided on the dummy can, after moving to the first station 6, e.g., a separate cleaning line separately provided from a cleaning line of the hydraulic cleaning part 4 configured to clean the dummy can and the cylindrical secondary battery.

That is, the brush 8, which is provided on the dummy can 1 that has been subjected to the crimping process, may be cleaned by the hydraulic cleaning part 4 and also cleaned by the first station 6. The first station 6 only serves to clean the dummy can 1.

In the embodiment of the present specification, the hydraulic cleaning part 4 and the first station 6 may each include a device (not illustrated) for supplying the cleaning agent.

The type of the cleaning agent is not limited as long as the cleaning agent may serve to remove the electrolyte. For example, a cleaning agent made by mixing water and a surfactant, absolute alcohol, or dimethyl carbonate (DMC) may be used.

As illustrated in FIGS. 3 and 4, the two or more dummy cans 1 may be loaded into the cleaning system, and the brush 8 of the dummy can, which has been used to clean the crimping device after the crimping device 3 has been cleaned, may be cleaned by the hydraulic cleaning part 4 or the first station 6.

That is, during the process in which the crimping device 3 is cleaned by the loaded two or more dummy can 1, the brush 8 of the dummy can, which has already been used to clean the crimping device, may be cleaned by the hydraulic cleaning part 4 or the first station 6.

In the embodiment of the present specification, the cleaning system cleans the crimping device 3 by continuous or intermittently loading the two or more dummy cans 1. The brush 8 of the remaining dummy can, which has not been used to clean the crimping device 3, may be cleaned by the hydraulic cleaning part 4 or the first station 6.

That is, the plurality of dummy cans 1 is used (to perform cleaning N times and drying M times), such that the brush 8 of the remaining dummy can may be cleaned even during the process of cleaning the crimping device 3. The reason why the two or more dummy cans are loaded is to improve the performance in cleaning the crimping device.

In the embodiment of the present specification, the cleaning system may further include a drying part 5 configured to dry at least one of the brush and the outer surface of the cylindrical secondary battery that have been cleaned by the hydraulic cleaning part 4. Alternatively, the cleaning system may further include a second station 7 configured to dry the brush cleaned by the first station 6.

In the embodiment of the present specification, the drying line may include the drying part, and the drying line may be connected to the cleaning line.

That is, this means that the drying part 5 is used in common to dry at least one of the brush and the outer surface of the cylindrical secondary battery cleaned by the hydraulic cleaning part 4.

With reference to FIGS. 3 and 4, the dummy can, which has been completely cleaned by the hydraulic cleaning part 4, is moved to the drying part 5, and the dummy can, which has been completely cleaned by the first station 6, is moved to the second station 7, such that the brush 8 of the dummy can is dried.

Therefore, the drying part 5 has not only the original purpose of drying the outer surface of the completely cleaned cylindrical secondary battery, but also the purpose of drying the brush provided on the dummy can used for the cleaning system of the present invention. That is, with reference to FIG. 3, the dummy can and the cylindrical secondary battery, which have been subjected to the cleaning process, may be moved along the same drying line and dried by the drying part 5 in the drying line.

The order in which the dummy can and the cylindrical secondary battery are dried by the drying part 5 is not limited. For example, after the dummy can 1 is loaded into the drying part 5, the cylindrical secondary battery 2 may be loaded and dried. Alternatively, the dummy can and the cylindrical secondary battery may be loaded in the reverse order or loaded simultaneously.

The second station only serves to dry the dummy can.

In the embodiment of the present specification, the drying part 5 and the second station 7 may each include a drying device (not illustrated) configured to dry the brush.

The type of drying device is not limited. The drying device may be a drying device using heat or airflow.

In the embodiment of the present specification, the dummy can, which has been completely dried by the drying part 5 or the second station 7, may be loaded back to the process of crimping the cylindrical secondary battery.

As described above, because the dummy can, which has been completely cleaned and dried, is loaded back into the crimping process, it is possible to effectively remove foreign substances attached to the crimping device without interruption with the process of manufacturing an electrode assembly.

While the present invention has been described above with reference to the limited drawings, it may be understood by those skilled in the art that the present invention may be variously modified and changed without departing from the spirit and scope of the present invention disclosed in the claims.

The invention claimed is:

1. A cleaning system comprising:

two or more dummy cans configured to clean a surface of a crimping device, wherein the crimping device is used for a process of crimping a cylindrical secondary battery for sealing an opened upper end of a battery can in which an electrode assembly and a cap assembly are accommodated, and wherein the two or more dummy cans each have a brush provided on an outer surface thereof, and the surface of the crimping device is cleaned by the brush.

2. The cleaning system of claim 1, wherein the surface of the crimping device is cleaned by physical friction with the brush.

3. The cleaning system of claim 1, wherein the crimping device is a roller and a punch configured to seal the cylindrical secondary battery by pressing the opened upper end of the battery can.

4. The cleaning system of claim 1, wherein the brush provided on the two or more dummy cans is cleaned in a cleaning line configured to clean the cylindrical secondary battery, and wherein the cleaning line configured to clean the cylindrical secondary battery is connected to a crimping line configured to perform a crimping process on the cylindrical secondary battery, and a drying line configured to perform a drying process on the cylindrical secondary battery.

5. The cleaning system of claim 4, wherein the cleaning line configured to clean the cylindrical secondary battery comprises:

a hydraulic cleaning part configured to mix water and a cleaning agent and clean the cylindrical secondary battery by nozzle spraying, and wherein at least one of the brush, which is provided on one of the two or more dummy cans, and an outer surface of the cylindrical secondary battery, which has been subjected to the crimping process, is cleaned by the hydraulic cleaning part.

6. The cleaning system of claim 5, wherein the brush, which has already been used to clean the crimping device, is cleaned by the hydraulic cleaning part.

7. The cleaning system of claim 5, wherein the cleaning system further comprises a drying part configured to dry at least one of the brush and the outer surface of the cylindrical secondary battery cleaned by the hydraulic cleaning part.

8. The cleaning system of claim 7, wherein each dummy can that has been dried by the drying part, is loaded back into the process of crimping the cylindrical secondary battery.

9. The cleaning system of claim 1, further comprising a first station configured to clean the brush by dipping the brush in a cleaning agent.

10. The cleaning system of claim 9, wherein the brush, which has already been used to clean the crimping device, is cleaned by the first station.

11. The cleaning system of claim 9, wherein the cleaning system further comprises a second station configured to dry the brush cleaned by the first station.

12. The cleaning system of claim 11, wherein each dummy can that has been dried by the second station is loaded back into the process of crimping the cylindrical secondary battery.

* * * * *